US011442220B1

(12) United States Patent
Lu et al.

(10) Patent No.: US 11,442,220 B1
(45) Date of Patent: Sep. 13, 2022

(54) ELECTRONIC DEVICE AND LIGHT INDICATOR MODULE THEREOF

(71) Applicant: Wistron NeWeb Corp., Hsinchu (TW)

(72) Inventors: Ying-Yen Lu, Hsinchu (TW); Yan-Da Chen, Hsinchu (TW); Shih-Hao Ou, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 0 days.

(21) Appl. No.: 17/480,188

(22) Filed: Sep. 21, 2021

(30) Foreign Application Priority Data

Apr. 14, 2021 (TW) ................................ 110113360

(51) Int. Cl.
*F21V 8/00* (2006.01)

(52) U.S. Cl.
CPC ......... *G02B 6/0066* (2013.01); *G02B 6/0078* (2013.01); *G02B 6/008* (2013.01); *G02B 6/0081* (2013.01)

(58) Field of Classification Search
CPC ..... G02B 6/0078; G02B 6/008; G02B 6/0081
See application file for complete search history.

(56) References Cited

U.S. PATENT DOCUMENTS 11,067,741 B1 * 7/2021 Ho ........................ G02B 6/0078
2012/0147584 A1 * 6/2012 Wu ........................ G06F 3/0202 362/23.16
2020/0341184 A1 10/2020 Yao

* cited by examiner

*Primary Examiner* — Keith G. Delahoussaye
(74) *Attorney, Agent, or Firm* — McClure, Qualey & Rodack, LLP

(57) ABSTRACT

A light indicator module is provided. The light indicator module includes a circuit board, a plurality of light sources, a light guide unit, and a shielding material. The light sources are disposed on the circuit board, and each light source provides a light beam. The light guide unit includes a plurality of guiding blocks. Each guiding block includes a light emitting surface, a light entering side surface, and at least one abuttal side surface. One of the light sources corresponds to the light entering side surface. The light beam enters the guiding block through the light entering side surface and is emitted through the light emitting surface. The abuttal side surface faces toward an adjacent guiding block. The shielding material covers the abuttal side surface.

11 Claims, 7 Drawing Sheets

ELECTRONIC DEVICE AND LIGHT INDICATOR MODULE THEREOF

CROSS-REFERENCE TO RELATED PATENT APPLICATION

This application claims the benefit of priority to Taiwan Patent Application No. 110113360, filed on Apr. 14, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a light indicator module, and more particularly, to a light indicator module that is suitable for use in an electronic device.

BACKGROUND OF THE DISCLOSURE

Electronic devices are often equipped with light indicator modules for indicating the state of charge or the quality of signal transmission. Conventionally, the light indicator module uses several light-emitting diodes (LED) as its light sources that can be lit separately in segments so as to form a light bar with indicating function. However, bright lines or dark lines usually exist in the light bar as the conventional technology is limited by the emission characteristics of LED light source, and the lines affect visual aesthetics and degrades the product quality.

SUMMARY OF THE DISCLOSURE

In response to the above-referenced technical inadequacies, the present disclosure provides a light indicator module that includes a circuit board, a plurality of light sources, a light guide unit, and a shielding material. The light sources are disposed on the circuit board, and each light source provides a light beam. The light guide unit includes a plurality of guiding blocks, wherein each guiding block has a light emitting surface, a light entering side surface, and at least one abuttal side surface. One of the light sources corresponds to the light entering side surface, and the light beam enters the guiding block through the light entering side surface and is emitted through the light emitting surface. The abuttal side surface faces toward an adjacent guiding block, and the shielding material covers the abuttal side surface.

Furthermore, the present disclosure provides an electronic device that includes a housing and a light indicator module described above. The housing has a light-transmitting window, and the light indicator module is disposed in the housing.

Therefore, by virtue of covering the abuttal side surface of the guiding block with the shielding material, the light source of different guiding block would not affect one another, and so the light indicator module according to the present disclosure is able to effectively reduce the bright lines and dark lines in the light bar. Hence, the visual aesthetics and the product/device quality are improved.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1A:
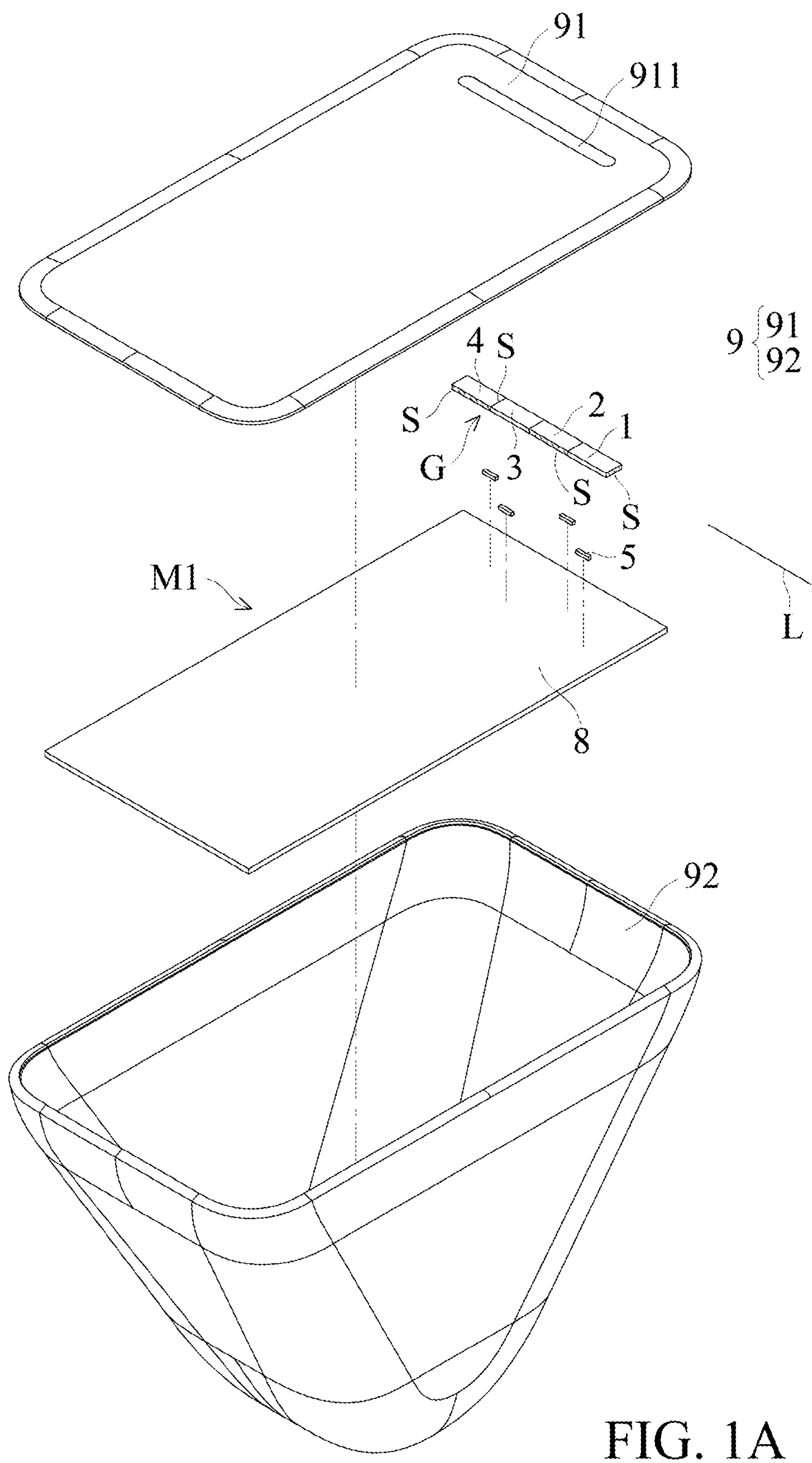
FIG. 1A is an exploded schematic diagram of an electronic device according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 1B:
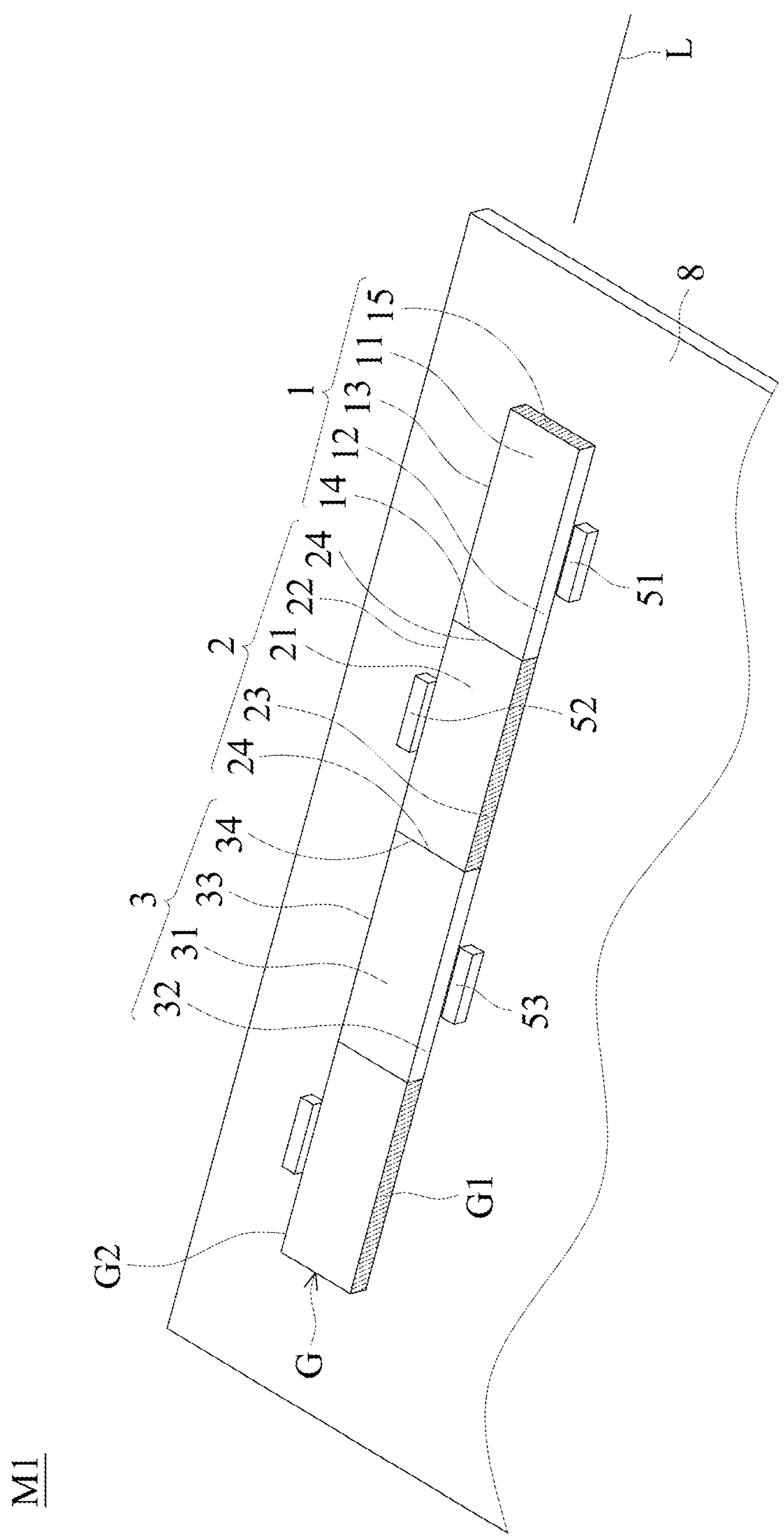
FIG. 1B is a schematic diagram of a light indicator module according to a first embodiment of the present disclosure.

Referring to FIGS. 1A and 1B, a first embodiment of the present disclosure provides an electronic device having a light indicator module M1 and a housing 9. The light indicator module M1 includes a circuit board 8, a plurality of light sources 5, a light guide unit G, and a shielding material S. The housing 9 includes a housing body 92 and a housing cover 91, and the housing cover 91 has a light-transmitting window 911. The light indicator module M1 is disposed in the housing body 92. The light sources 5 are disposed on the circuit board 8, wherein each light source 5 provides a light beam. The light guide unit G includes a plurality of guiding blocks 1, 2, 3, 4. In this embodiment, the guiding blocks 1, 2, 3, 4 are arranged along a straight line L; in other words, the guiding blocks 1, 2, 3, 4 are arranged in a straight line.

According to the first embodiment of the present disclosure, each guiding block has a light emitting surface, a light entering side surface, and at least one abuttal side surface, wherein one of the light sources corresponds to the light entering side surface, and the light beam enters the guiding block through the light entering side surface and is emitted through the light emitting surface. The abuttal side surface faces toward another guiding block that is adjacent to it, and the shielding material covers the abuttal side surface. Each guiding block further includes at least one light blocking side surface, and the shielding material also covers the light blocking side surface. More specifically, as shown in the embodiment of FIG. 1B, the light guide unit G includes a first unit side surface G1 and a second unit side surface G2, and the first unit side surface G1 and the second unit side surface G2 are opposite to each other. The guiding blocks include a first guiding block 1 and a second guiding block 2 that is adjacent to the first guiding block 1. The first guiding block 1 has a first light emitting surface 11, a first light entering side surface 12, a first light blocking side surface 13, and at least one first abuttal side surface 14. The second guiding block 2 has a second light emitting surface 21, a second light entering side surface 22, a second light blocking side surface 23, and at least one second abuttal side surface 24. The first abuttal side surface 14 faces toward the second abuttal side surface 24. The first light entering side surface 12 and the second light blocking side surface 23 are positioned on the first unit side surface G1, and the second light entering side surface 22 and the first light blocking side surface 13 are positioned on the second unit side surface G2. The light sources 5 include a first light source 51 and a second light source 52, wherein the first light source 51 corresponds to the first light entering side surface 12, and the second light source 52 corresponds to the second light entering side surface 22.

Figure 2:
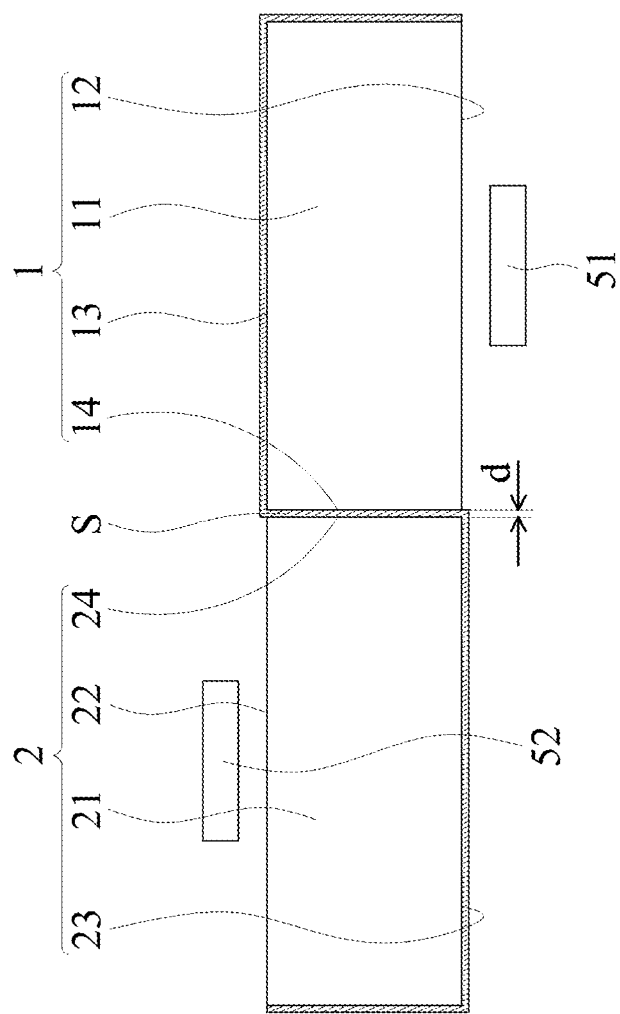
FIG. 2 shows a detailed structure of a first guiding block and a second guiding block according to an embodiment of the present disclosure.

Referring to FIG. 2, the thickness of the shielding material S between two adjacent abuttal side surfaces in one embodiment is more than 0 mm and less than or equal to 0.2 mm. In particular, the thickness d of the shielding material S between the first abuttal side surface 14 and the second abuttal side surface 24 is more than 0 mm and less than or equal to 0.2 mm. In short, a thickness of the shielding material between two of the at least one abuttal side surface adjacent to one another is more than 0 mm and less than or equal to 0.2 mm.

Since the light indicator module according to an embodiment of the present disclosure covers the abuttal side surface of the guiding block with the shielding material, the light source of different guiding block will not affect each other, and so the bright lines and dark lines in the light bar is effectively reduced. Hence, the visual esthetics is improved and the quality of the product/electronic device is enhanced.

Referring to FIG. 1B, the light indicator module M1 according to the first embodiment of the present disclosure further includes a third guiding block 3 as one of the guiding blocks. The third guiding block 3 is adjacent to the second guiding block 2 and has a third light emitting surface 31, a third light entering side surface 32, a third light blocking side surface 33, and a third abuttal side surface 34. The third abuttal side surface 34 faces toward another one of the second abuttal side surface 24 of the second guiding block 2. The third light entering side surface 32 is positioned on the first unit side surface G1, and the third light blocking side surface 33 is positioned on the second unit side surface G2. The light sources 5 includes a third light source 53 which corresponds to the third light entering side surface 32.

In this embodiment, the light sources and the light entering side surfaces are disposed in an interleaved arrangement. In addition, each guiding block has the light blocking side surface, and thus the light sources of different guiding blocks are further prevented from affecting each other, such as by preventing the light beam of the first light source from entering the second light entering side surface.

In one embodiment, the first guiding block 1 further includes a side surface end 15 as shown in FIG. 1B. The side surface end 15 is positioned at one end of the light guide unit G, and the shielding material S covers the side surface end 15. In specific, the shielding material S covers all of the side surfaces of the guiding block except the light entering side surface in one embodiment of the present disclosure.

Figure 3:
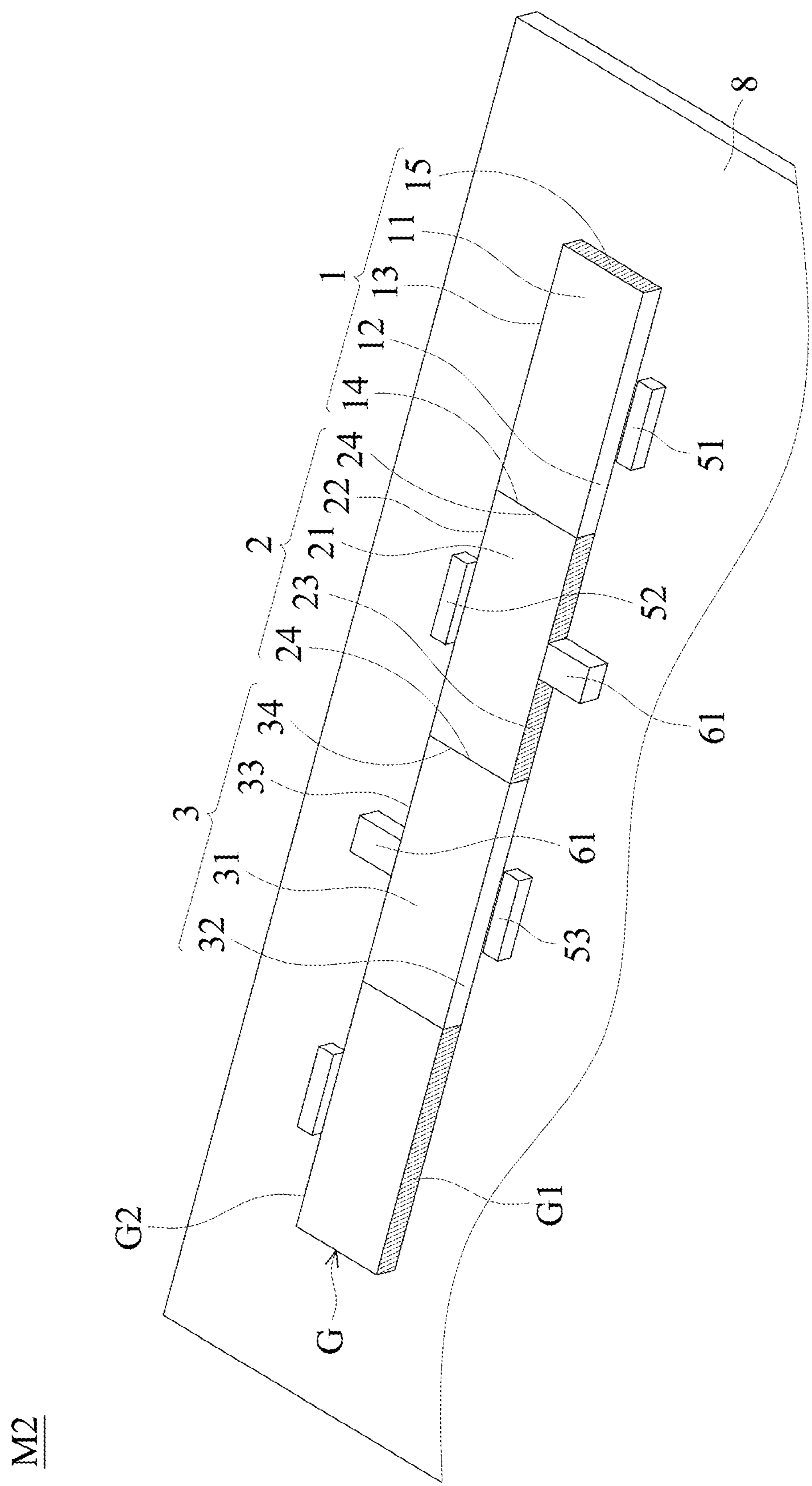
FIG. 3 is a schematic diagram of a light indicator module according to a second embodiment of the present disclosure.

Referring to FIG. 3, the light indicator module M2 according to a second embodiment of the present disclosure further includes an obstacle 61 disposed between the first light source 51 and the third light source 53. The obstacle 61 corresponds to the second light blocking side surface 23 and is used to prevent the light beam provided by the first light source 51 from entering the third light entering side surface 32 as well to prevent the light beam provided by the third light source 53 from entering the first light entering side surface 12. Thus, the cross-influence between the light sources of different guiding blocks is further diminished.

Figure 4:
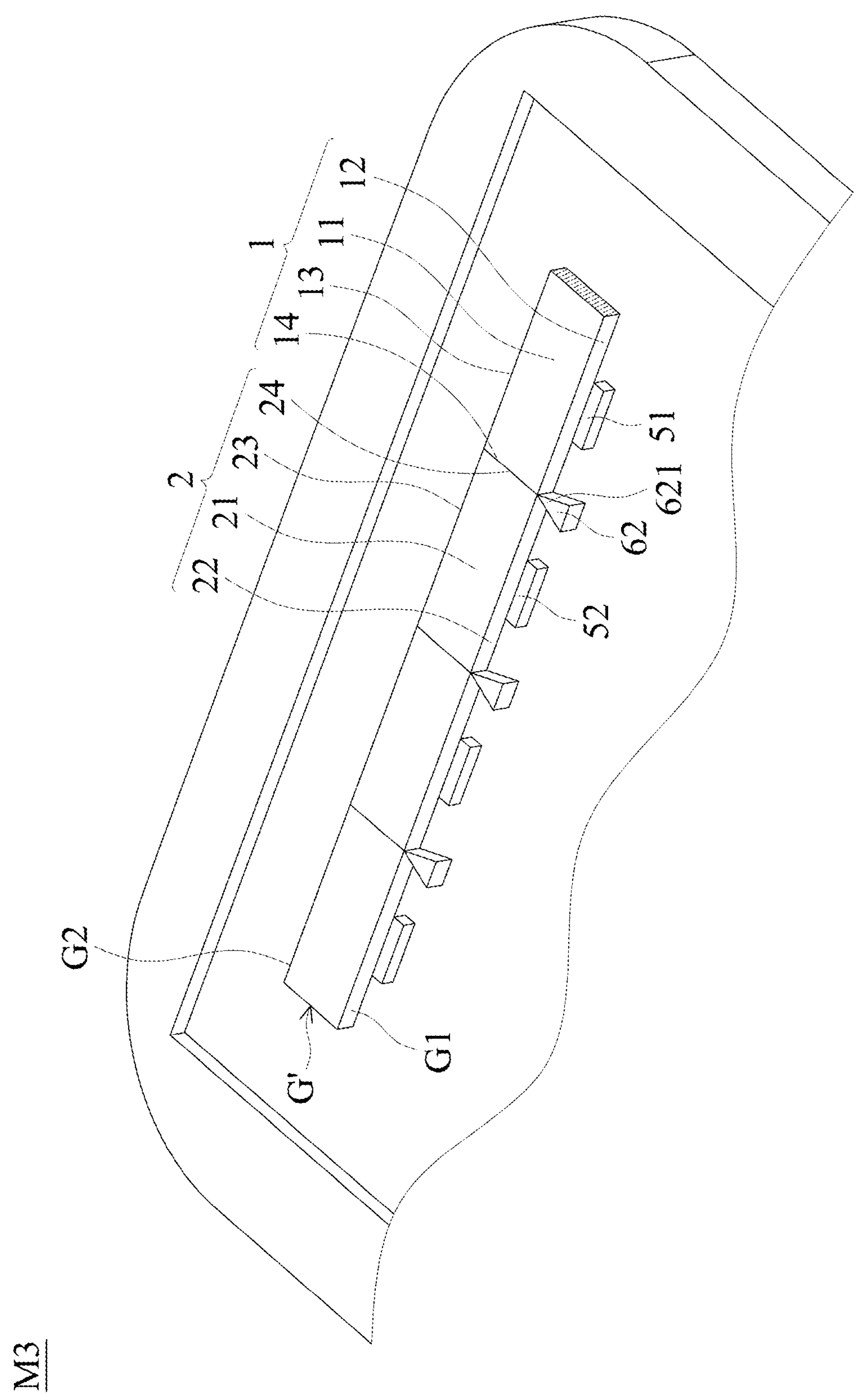
FIG. 4 is a schematic diagram of a light indicator module according to a third embodiment of the present disclosure.

In the light indicator module M3 according to a third embodiment of the present disclosure shown in FIG. 4, the light guide unit G' has a first unit side surface G1 and a second unit side surface G2 that is opposite to the first unit side surface G1. The plurality of guiding blocks includes a first guiding block 1 and a second guiding block 2 that is adjacent to the first guiding block 1. The first guiding block 1 has a first light emitting surface 11, a first light entering side surface 12, a first light blocking side surface 13, and at least one first abuttal side surface 14. The second guiding block 2 has a second light emitting surface 21, a second light entering side surface 22, a second light blocking side surface 23, and at least one second abuttal side surface 24. The first abuttal side surface 14 faces toward the second abuttal side surface 24. The first light entering side surface 12 and the second light entering side surface 22 are positioned on the first unit side surface G1, and the first blocking side surface 13 and the second light blocking side surface 23 are positioned on the second unit side surface G2. The light sources 5 include a first light source 51 and a second light source 52, wherein the first light source 51 corresponds to the first light entering side surface 12, and the second light source 52 corresponds to the second light entering side surface 22.

Referring to FIG. 4, the light indicator module M3 further includes an obstacle 62 that is disposed between the first light source 51 and the second light source 52 and corresponds to the junction of the first guiding block 1 and the second guiding block 2. In this embodiment, the obstacle 62 is the main component used to prevent the light beam provided by the first light source 51 from entering the second light entering side surface 22 as well as to prevent the light beam provided by the second light source 52 from entering the first light entering side surface 12.

In one embodiment, the obstacle 62 has a cone-shaped portion 621 as shown in FIG. 4, wherein the tip of the cone-shaped portion 621 corresponds to the junction of the first guiding block 1 and the second guiding block 2. The design of the cone-shaped portion 621 prevents the occurrence of dark regions.

Figure 5:
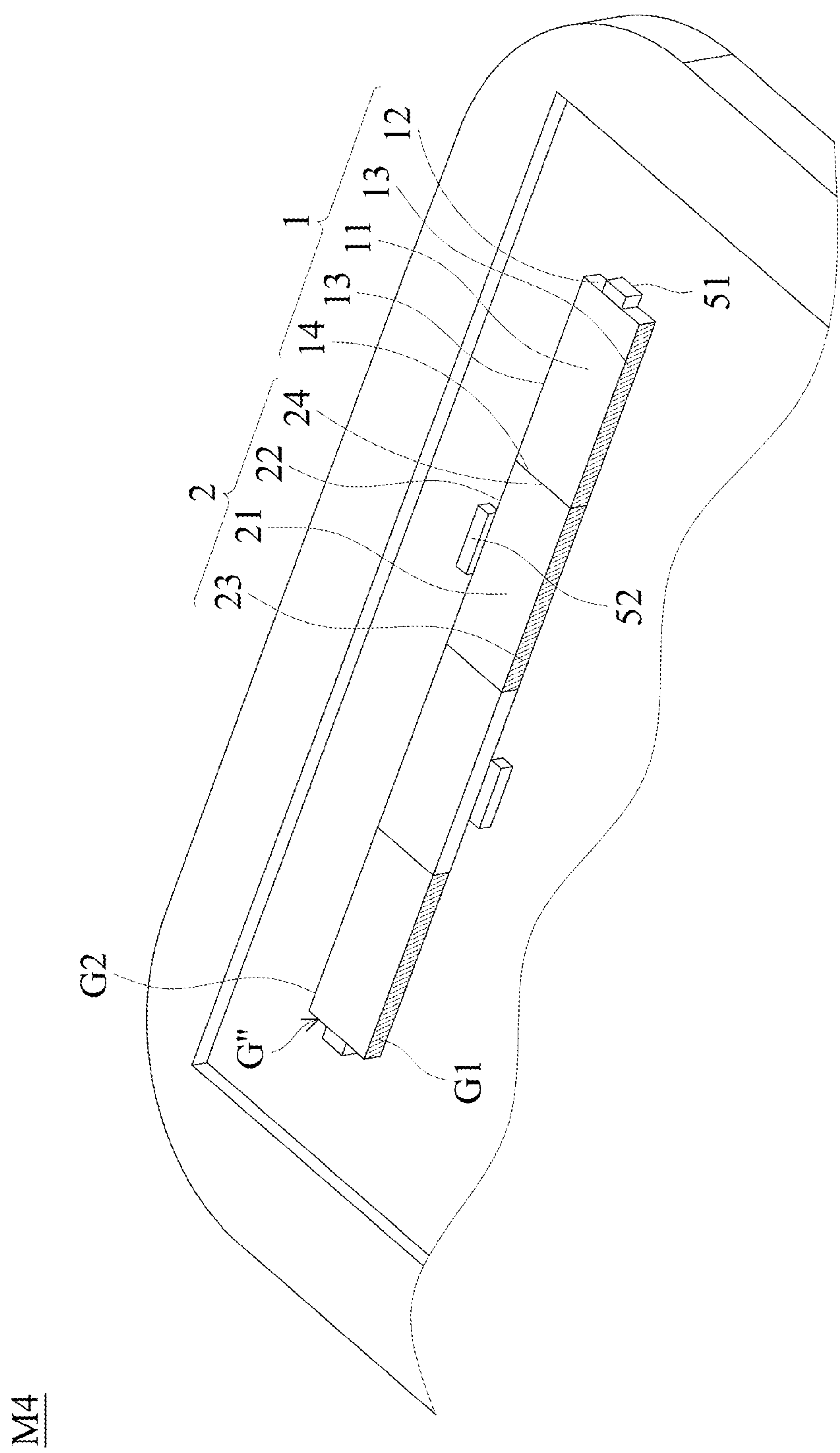
FIG. 5 is a schematic diagram of a light indicator module according to a fourth embodiment of the present disclosure.
Figure 6C:
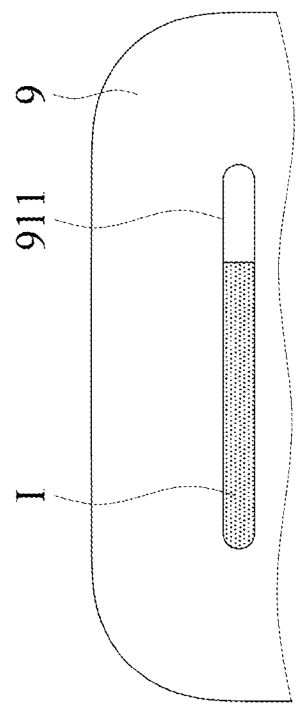
FIGS. 6A to 6D show a display output by a light indicator module according to an embodiment of the present disclosure.
Figure 6D:
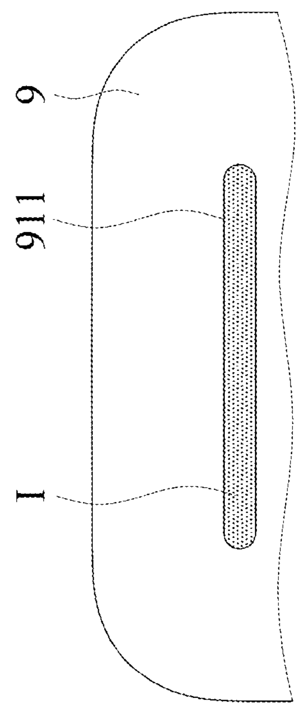
Figure 6A:
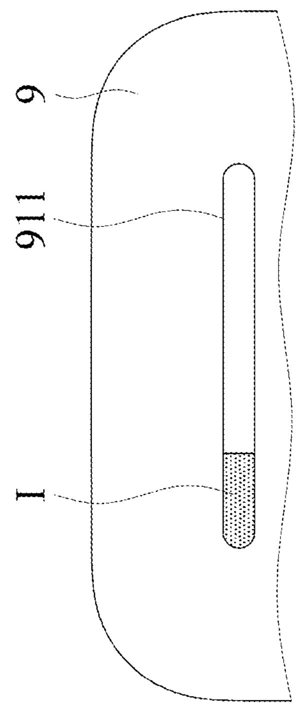
Figure 6B:
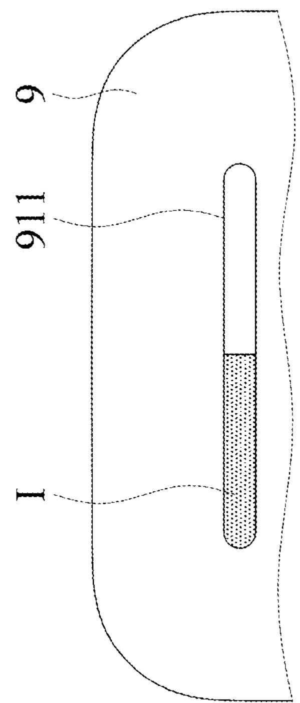

Referring to FIG. 5, which shows the light indicator module M4 according to a fourth embodiment of the present disclosure, the light guide unit G" has a first unit side surface G1 and a second unit side surface G2, wherein the first unit side surface G1 and the second unit side surface G2 are opposite to each other. The plurality of guiding blocks includes a first guiding block 1 and a second guiding block 2, wherein the second guiding block 2 is adjacent to the first guiding block 1. The first guiding block 1 has a first light emitting surface 11, a first light entering side surface 12, two first light blocking side surfaces 13, and a first abuttal side surface 14. The second guiding block 2 has a second light emitting surface 21, a second light entering side surface 22, a second light blocking side surface 23, and at least one second abuttal side surface 24. The first abuttal side surface 14 faces toward the second abuttal side surface 24, and the first light entering side surface 12 is perpendicular to the second light entering side surface 22. One of the two first light blocking side surfaces 13 and the second light blocking surface 23 are positioned on the first unit side surface G1, and the other one of the two first light blocking side surfaces 13 and the second light entering side surface 22 are positioned on the second unit side surface G2. The light sources 5 include a first light source 51 and a second light source 52, wherein the first light source 51 corresponds to the first light entering side surface 12, and the second light source 52 corresponds to the second light entering side surface 22.

Referring to FIGS. 6A-6D, when the light indicator module according to an embodiment of the present disclosure is used to display a status of an electronic device such as battery level, the light indicator module presents a light bar I through the light-transmitting window 911 of the housing 9. The length of the light bar I changes in accordance with the status of the electronic device, and due to the aforementioned light shielding design in the light indicator module, there is no bright lines or dark lines in the light bar I.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An electronic device comprising:

a housing, comprising a light-transmitting window, wherein the light-transmitting window is a singular longitudinal opening; and a light indicator module, disposed in the housing and comprising: a circuit board;

a plurality of light sources, disposed on the circuit board, wherein each of the plurality of light sources provides a light beam;

a light guide unit, comprising:

a plurality of guiding blocks, each of the plurality of guiding blocks comprising a light emitting surface, a light entering side surface, and at least one abuttal side surface, and the at least one abuttal side surface facing toward an adjacent one of the plurality of guiding blocks, wherein one of the plurality of light sources corresponds to the light entering side surface, the light beam enters the guiding block through the light entering side surface and is emitted through the light emitting surface before penetrating the light-transmitting window to exit the housing, wherein all of the guiding blocks face to the light-transmitting window; and a shielding material covering the at least one abuttal side surface, wherein a thickness of the shielding material between two of the at least one abuttal side surface adjacent to one another is more than 0 mm and less than or equal to 0.2 mm.

2. The electronic device according to claim 1, wherein the plurality of guiding blocks are arranged in a straight line.

3. The electronic device according to claim 2, wherein each of the plurality of guiding blocks further comprises at least one light blocking side surface, and the shielding material covers the at least one light blocking side surface.

4. The electronic device according to claim 3, wherein the light guide unit further comprises a first unit side surface and a second unit side surface opposite the first unit side surface, the plurality of guiding blocks comprises a first guiding block and a second guiding block adjacent to the first guiding block, the first guiding block comprises a first light emitting surface, a first light entering side surface, a first light blocking side surface, and at least one first abuttal side surface, the second guiding block comprises a second light emitting surface, a second light entering side surface, a second light blocking side surface, and at least one second abuttal side surface, the at least one first abuttal side surface faces toward the at least one second abuttal side surface, the first light entering side surface and the second light blocking side surface are positioned on the first unit side surface, the second light entering side surface and the first light blocking side surface are positioned on the second unit side surface, the plurality of light sources comprises a first light source and a second light source, the first light source corresponds to the first light entering side surface, and the second light source corresponds to the second light entering side surface.

5. The electronic device according to claim 4, wherein the plurality of guiding blocks further comprises a third guiding block adjacent to the second guiding block and comprising a third light emitting surface, a third light entering side surface, a third light blocking side surface, and a third abuttal side surface, the third abuttal side surface faces toward another one of the at least one second abuttal side surface of the second guiding block, the third light entering side surface is positioned on the first unit side surface, the third light blocking side surface is positioned on the second unit side surface, and the plurality of light sources comprises a third light source corresponding to the third light entering side surface.

6. The electronic device according to claim 5, further comprising an obstacle disposed between the first light source and the third light source and corresponding to the second light blocking side surface.

7. The electronic device according to claim 2, wherein the first guiding block further comprises a side surface end disposed at one end of the light guide unit, and the shielding material covers the side surface end.

8. The electronic device according to claim 3, wherein the light guide unit comprises a first unit side surface and a second unit side surface opposite the first unit side surface, the plurality of guiding blocks comprises a first guiding block and a second guiding block adjacent to the first guiding block, the first guiding block comprises a first light emitting surface, a first light entering side surface, a first light blocking side surface, and at least one first abuttal side surface, the second guiding block comprises a second light emitting surface, a second light entering side surface, a second light blocking side surface, and at least one second abuttal side surface, the at least one first abuttal side surface faces toward the at least one second abuttal side surface, the first light entering side surface and the second light entering side surface are positioned on the first unit side surface, the first light blocking side surface and the second light blocking side surface are positioned on the second unit side surface, the plurality of light sources comprises a first light source and a second light source, the first light source corresponds to the first light entering side surface, and the second light source corresponds to the second light entering side surface.

9. The electronic device according to claim 8, further comprising an obstacle disposed between the first light source and the second light source and corresponding to a junction of the first guiding block and the second guiding block.

10. The electronic device according to claim 9, wherein the obstacle comprises a cone-shaped portion, and a tip of the cone-shaped portion corresponds to the junction of the first guiding block and the second guiding block.

11. The electronic device according to claim 3, wherein the light guide unit comprises a first unit side surface and a second unit side surface opposite the first unit side surface, the plurality of guiding blocks comprises a first guiding block and a second guiding block adjacent to the first guiding block, the first guiding block comprises a first light emitting surface, a first light entering side surface, two first light blocking side surfaces, and a first abuttal side surface, the second guiding block comprises a second light emitting surface, a second light entering side surface, a second light blocking side surface, and at least one second abuttal side surface, the first abuttal side surface faces toward the at least one second abuttal side surface, the first light entering side surface is perpendicular to the second light entering side surface, one of the two first light blocking side surfaces and the second light blocking side surface are positioned on the first unit side surface, the other one of the two first light blocking side surfaces and the second light entering side surface are positioned on the second unit side surface, the plurality of light sources comprises a first light source and a second light source, the first light source corresponds to the first light entering side surface, and the second light source corresponds to the second light entering side surface.

* * * * *